United States Patent [19]
Hedler

[11] 3,720,306
[45] March 13, 1973

[54] MEANS AND PROCESS FOR ACHIEVING A CONTROLLED PARTICLE SIZE RANGE OF CATHODE RAY TUBE PHOSPHORS

[75] Inventor: Robert A. Hedler, Seneca Falls, N.Y.

[73] Assignee: GTE Sylvania Incorporated, Seneca Falls, N.Y.

[22] Filed: Jan. 7, 1971

[21] Appl. No.: 104,572

[52] U.S. Cl. .................. 209/1, 209/269, 210/19, 209/10
[51] Int. Cl. ................................ B07b 1/28
[58] Field of Search....209/1, 20, 233, 237, 268, 269, 209/346, 10; 210/19; 252/301.2, 501

[56]  References Cited

UNITED STATES PATENTS

| 351,057 | 10/1886 | Litchfield | 209/269 X |
| 678,932 | 7/1901 | Birch | 209/269 |
| 2,468,550 | 4/1949 | Fruth | 210/19 X |
| 2,409,524 | 10/1946 | Ahlfors | 210/19 X |
| 2,650,872 | 9/1953 | Goldwasser | 210/19 X |
| 2,896,922 | 9/1959 | Pohlman | 209/1 X |
| 3,200,567 | 8/1965 | May | 210/19 X |
| 3,351,194 | 11/1967 | Butler | 209/17 X |
| 3,490,584 | 1/1970 | Balamuth | 209/1 |

OTHER PUBLICATIONS

Taime, Min. Eng., June 1956, 639–644.

Primary Examiner—Tim R. Miles
Assistant Examiner—Robert Halper
Attorney—Norman J. O'Malley, Donald R. Castle and Frederick H. Rinn

[57] ABSTRACT

An efficient means and process for achieving a cathodoluminescent phosphor suspension of predeterminately controlled particle size for use in a cathode ray tube screening formulation to realize a high resolution type screen. A portion of a first liquid suspension formed of incoming phosphor material is transferred to sieve means oriented in a shallow quantity of collector liquid agitated by ultrasonic energy. The sieve is discreetly moved in the agitated collector liquid to effect a gentle pumping action to expedite an exchange of liquid and particles therethrough and form a second suspension of sieve-sized phosphor particles which is adjusted for use in the screening operation.

8 Claims, 1 Drawing Figure

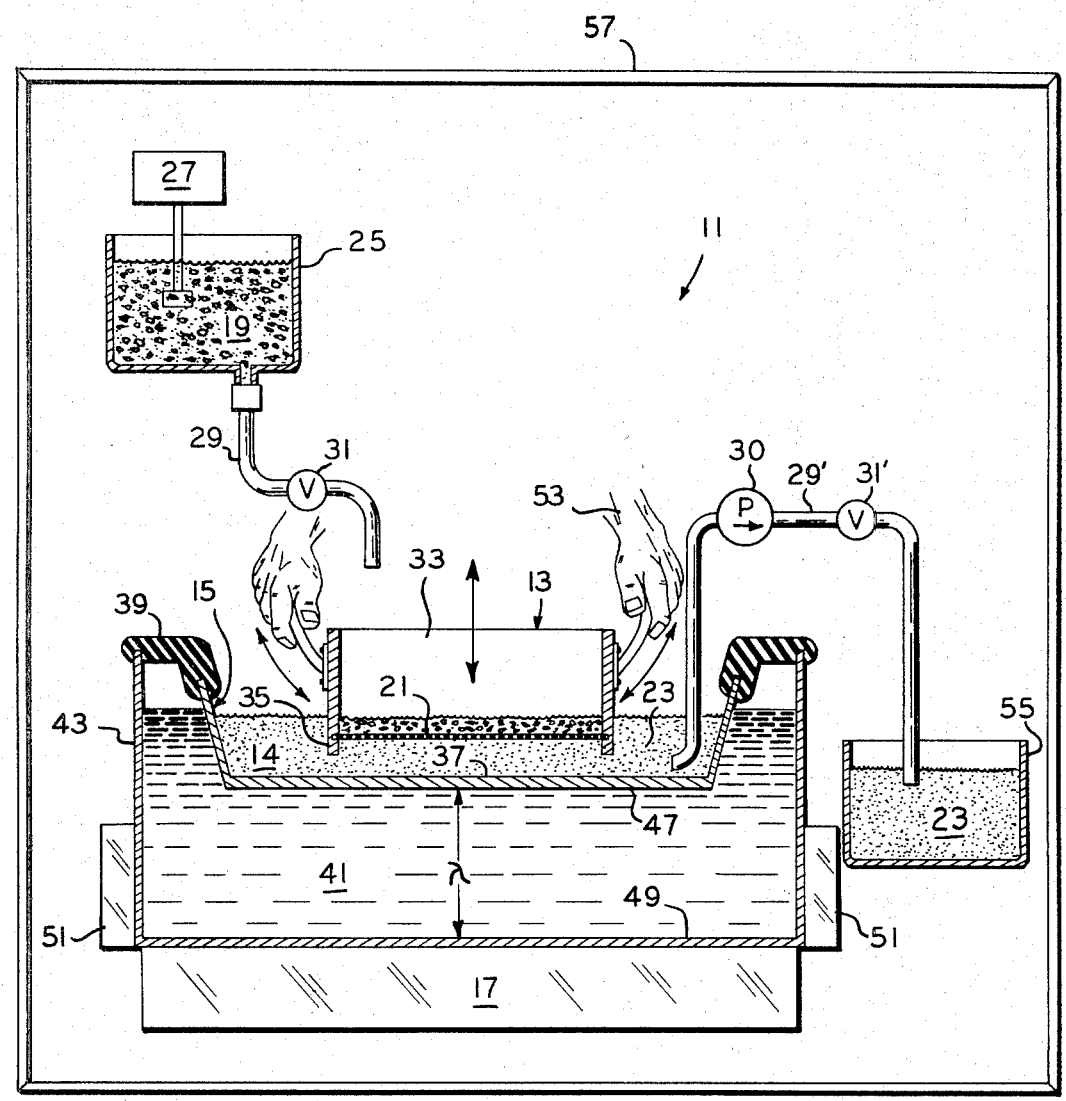

MEANS AND PROCESS FOR ACHIEVING A CONTROLLED PARTICLE SIZE RANGE OF CATHODE RAY TUBE PHOSPHORS

BACKGROUND OF THE INVENTION

This invention relates to the manufacturing of cathode ray tube screens and more particularly to the means and process for achieving a phosphor suspension of controlled particle size for use in fabricating a cathode ray tube screen.

In certain types of cathode ray tubes, such as those employed in video recording and flying spot scanner applications, fine line high resolution screens are of prime importance. Tubes of this type conventionally utilize optical quality faceplates whereon the related cathodoluminescent screens are formed of fine particle size phosphor materials of 10 microns and less. Such screens are held to very tight tolerances for uniformity of thickness and screen blemishes.

The phosphor materials, as commercially furnished, usually represent a particle size distribution that is greater than that desired for high resolution screen fabrication. For example, a typical P–16 type dry phosphor material, as received, may have from 25 to 40 percent by weight of particle sizes ranging above 10 microns. To form the first-line uniform screen desideratum, it is necessary to remove the deleterious larger particles from the phosphor material before screening.

Dry handling of the material to size or work it through precision micro-mesh sieves, having openings of substantially 5 or 10 microns therein, is an inefficient procedure as the dry particles tend to agglomerate as a result of electrostatic charge buildup and obstruct or blind the foraminous openings of the sieve. This procedure has been found to be ineffective in achieving the desired results.

Another technique for segregating small-sized particled material is the elutriation process wherein the phosphor is liquid suspended, the larger particles allowed to settle, and the remaining finer-particled suspension decanted for screening. While this procedure is usually sequentially repeated several times, it has been found to be an inefficient and time consuming technique. Furthermore, the separation by particle size is not exact. Analyses shows that the elutriated phosphor contains from 10 to 30 percent by weight of particles greater than 10 microns. The process is inconsistent in that the resultant phosphor concentration varies widely due to varied particle size ranges in the incoming material. The inefficiency of the operation is accentuated by the results whereof only about 5 percent of the starting amount of phosphor is evidenced in the final usable phosphor suspension.

OBJECTS AND SUMMARY OF THE INVENTION

It is an object of the invention to reduce the aforementioned disadvantages and to provide an improved and efficient means and process for achieving a high yield of controlled particle size range of cathode ray tube phosphors without degradation of the crystal structure thereof.

Another object is to provide an improved means and process for achieving a cathodoluminescent phosphor suspension of predeterminately controlled particle size for use in a cathode ray tube screening formulation to provide a high resolution display screen.

The foregoing objects are realized in one aspect of the invention by the provision of an improved means and process wherein a first liquid suspension is formed of the diverse-particle-size phosphor material as received. At least a portion of this suspension is transferred to a micro-mesh sieve means oriented in a shallow quantity of collector liquid agitated by ultrasonic energy. The sieve is moved in the ultrasonically agitated collector liquid to provide a gentle pumping action whereupon an exchange of suspension liquid, collector liquid and sieve-sized particles is effected through the foraminous sieve area to provide a thorough dispersion in the form of a second liquid suspension of sieve-sized phosphor particles whereof the particles retain their normal crystal structures and luminous properties. The phosphor solids concentration of the second suspension is adjusted to that required for utilization in the cathode ray tube screening formulation.

BRIEF DESCRIPTION OF THE DRAWING

The FIGURE is a sectional view showing the means utilized in the invention.

DESCRIPTION OF THE PREFERRED EMBODIMENT

For a better understanding of the present invention, together with other and further objects, advantages and capabilities thereof, reference is made to the following specification and appended claims in connection with the aforedescribed drawing.

With reference to the drawing, cooperating apparatus means 11 are shown for achieving a first liquid suspension of cathode ray tube phosphor material having a controlled particle-size range. Movable sieve means 13 for selectively sizing the phosphor material is oriented in a shallow quantity of collector liquid 14 contained in liquid holding means 15. This holding means is positioned in a manner to receive ultrasonic energy emanating from a defined source 17. A portion of a first liquid suspension of a diverse-particle-size phosphor material 19 is transferred to the sieve means 13 which, in turn, is moved in the ultrasonic environment in a manner to promote the transfer of small size phosphor particles through the foraminous area 21 of the sieve into the collector liquid 14 to effect a thorough dispersion and form the desired suspension of sieve-sized particles 23.

In greater detail, the first suspension 19 of the phosphor material as-received is prepared in or transferred to the supply container 25. The constitution of this first suspension 19 may, for adequacy, have a 10 percent solids content in a liquid such as water. As shown, the apparatus in the figure is primarily for batch-size utilization but the means and process are not intended to be limited to such, as adaptations can be made to accommodate larger size handling and substantially continuous operation. For example, the first diverse-particle-size suspension 19 is prepared by mixing approximately 150 grams of phosphor material in substantially 1,500 cc. of water. Agitation means 27 is utilized to promote forming and maintenance of the suspension. A portion such as about 125 cc. of this first suspension is transferred by discrete pouring, or by suitable conduit 29 and valving means 31, into micro-mesh sieve means 13, such as an 8 or 10 inch size having an upstanding wall 33 peripheral to the foraminous area 21 thereof. The apertures in the foraminous area 21, which may be electroformed manufacture, are of a size to permit the passage or selective sizing of phosphor particles therethrough ranging dimensionally up to and including 10 microns in size, but such is not be be considered limiting.

Sieve means 13, having a peripheral stand-off or spacing means 35 extending downward from the foraminous areas 21, is oriented within liquid holding means 15 in the form of an open flat-bottom container of a rigid material, such as glass or metal, having smooth inner and outer surfaces. The container 15 has a quantity of collector liquid, such as pure water therein, in an amount of about 2 liters to facilitate coverage of the foraminous area 21 of the sieve which, as aforementioned, is spaced from the smooth inner surface of the container bottom 37.

The liquid holding means or collector container 15 is freely supported by several holding means 39 in a defined liquid bath 41 such as water, confined in a suitable reservoir 43. This reservoir has a source of predetermined ultrasonic energy 17 associated therewith in a manner to impart ultrasonic waves to the defined liquid bath 41. The smooth bottom exterior surface 47 of the collector container 15 is oriented in at least even fractional wavelength $\lambda$ relationship with the smooth bottom 49 of the reservoir 43 against which the transducers of the ultrasonic energy source 17 are positioned. It has been found in this application that the operating frequency of the ultrasonic energy environment is tuned within he range of substantially 20 to 80 Khz and exhibits a power density within the range of substantially 2 to 4 watts/in$^2$.

Heater means 51 are positioned relative to the reservoir 43 in a manner to heat the liquid bath 41 to a controlled temperature conductive for the efficient propagation of ultrasonic energy through the distance $\lambda$. When using water as the liquid bath, it has been found that a water temperature of approximately 140° Fahrenheit is advantageous for facilitating the transfer of energy from the transducer to the collector container 15, whereupon the confined collector water therein is desirably agitated by the surrounding ultrasonic energy environment.

Movement of sieve 13, whereof the foraminous area immersed in the collector liquid 14 and having a portion of the first suspension transferred thereinto, is actuated and maintained by manual means 53 or by mechanical means, not shown. Such movement is produced in a predetermined substantially vertical manner combined with a slowly and slightly tilting motion of the sieve means 13 which promotes a gentle pumping action and minimizes blinding of the openings in the sieve. This pumping movement of the sieve, in conjunction with the ultrasonic agitation, effects an exchange of suspension liquid, collector liquid and sieve-sized particles through the foraminous sieve area 21 to promote the formation of a second liquid suspension 23 of sieve-sized phosphor particles not exceeding substantially 10 microns in size. The gentle pumping movement is continued in a moderate reciprocating manner, as for example, not exceeding substantially 10 cycles/min., until the phosphor particles passable by the openings in the movable sieve 13 are substantially transferred from the sieve to the collector liquid 14, along with the first suspension liquid which inherently becomes mixed therewith. More of the first suspension 19 is then transferred to the sieve, and the movement maintained to continue formation of the aforementioned second suspension 23. hen the accumulation of the residual large size phosphor particles within the confines of the sieve 13 hinders the efficiency of the pumping action, the sieve is removed from the collector container 15 and cleaned as by reversely flushing with clean water. Sieving of the first suspension 19 is continued until the solids content of the second suspension 23 is concentrated to a value greater than that required for use in the subsequent cathode ray tube screen forming procedure. Upon reaching this greater concentration, the second suspension 23 is transferred from the ultrasonic environment to a storage container 55, as for example, by the respective conduit and valving means 29' and 31'. Transference may be expedited by utilizing pumping means 30 which handles the second suspension material in a non-destructive manner.

While aqueous suspensions have been described as typical examples, it has been found that dilute amounts of the electrolyte materials subsequently utilized in the respective screening formulation can be added to and be present in the collector liquid 14 during sieving. For example, the addition of a binder material, such as potassium silicate, to the collector water alters the degree of dispersion of the phosphor particles in the second suspension; while the inclusion of a screen gelling material, such as sodium bicarbonate or barium acetate, in the collector water modifies or increases the rate of sedimentation of the phosphor particles in the second suspension. Thus, if desired, changes in the time factors of the screen forming procedure can be effected by the addition of screening substances during the constitution of the second phosphor suspension.

Prior to incorporation of the second suspension 23 into the cathode ray tube screening formulation, the phosphor solids concentration in the second suspension is adjusted to the value required for the particular screen settling procedure. This adjustment is usually accomplished by the addition of the liquid base of the suspension.

The means and process of the invention have been found to be markedly advantageous. The process results indicate that the yields of usable particle-sized phosphor range from substantially 45 to 65 weight percent as compared to approximately 5 weight percent for the aforementioned elutriation procedure. The invention affords efficient control of the resultant phosphor particle size distribution, thus variations of incoming lots of diverse-size phosphor material do not affect the quality of the final second suspension of the subsequently formed screen. The preparation of a concentrated suspension of phosphor solids by this invention facilitates adjustment of the suspension to optimize the cathode ray tube screening formulation thereby obtaining maximum control of the resultant screen weight. The ultrasonic action utilized in the invention, in conjunction with the discrete pumping movement of the sieve, results in a complete deagglomeration and thorough dispersion of the phosphor material which is accomplished without altering of the phosphor crystal structure thereby retaining the desired luminous efficiency thereof.

To insure optimum quality of the second suspension 23, it has been found expedient to practice the invention in a controlled atmosphere environment 57, such as a clean-room or booth enclosure wherein the presence of ambient contaminants is minimized.

Thus there is provided an improved and efficient means and process for achieving a high yield of a controlled particle-size range of cathode ray tube phosphors. The resulting suspension of closely controlled particle-size material is advantageously utilized in a forming of a high resolution cathode ray tube display screen.

While there have been shown and described what are at present considered the preferred embodiments of the invention, it will be obvious to those skilled in the art that various changes and modifications gay be made therein without departing from the scope of the invention as defined by the appended claims.

I claim:

1. A process for achieving a cathodoluminescent phosphor suspension of predeterminately controlled particle size for use in a cathode ray tube screening formulation to achieve a high resolution type screen having uniform thickness, said process comprising the steps of:

preparing a first aqueous suspension of diverse-particle-size phosphor material;

selectively sizing said diverse-particled suspension by transferring at least a portion thereof into a walled micromesh sieve means oriented in a shallow quantity of collector liquid at a depth sufficient to cover the foraminous area of said sieve, said collector liquid being confined in an open flat-bottom container of a substantially rigid smooth surface material freely supported in a temperature controlled liquid bath agitated by a source of ultrasonic energy, said collector liquid container being positioned in a manner that the bottom exterior surface thereof is at least in even fractional wavelength relationship with said energy source;

moving said sieve means substantially vertically in said collector liquid in a substantially reciprocating manner combined with a slowly and slightly tilting motion to provide a gentle pumping action, whereupon an exchange of suspension liquid, collector liquid and sieve-sized particles is effected through said foraminous sieve area, said movement and said ultrasonic agitation being continued until said first suspension liquid and the phosphor particles therein passable by said sieve are substantially transferred to said collector liquid to form a second suspension of sieve-sized phosphor particles;

removing said sieve means with the residual phosphor particles therein from said second suspension;

transferring said second suspension from said ultrasonic energy environment; and adjusting the phosphor solids concentration of said second suspension to that required for utilization in said cathode ray tube screening formulation.

2. A process for achieving a phosphor suspension according to claim 1 wherein the first liquid suspension is transferred to said sieve in amounts to permit movement of said diverse-particled material relative to the foraminous area in a manner to facilitate said pumping action and minimize blinding of the openings in said sieve.

3. A process for achieving a phosphor suspension according to claim 1 wherein said ultrasonic energy environment is provided by an energy source having frequency energy tuned within the range of substantially 20 to 80 Khz and power density within the range of substantially 2 to 4 watts per square inch.

4. A process for achieving a phosphor suspension according to claim 1 wherein said second liquid suspension comprises sieve-sized phosphor particles not substantially exceeding ten microns in size.

5. A process for achieving a phosphor suspension according to claim 1 wherein said sieving is accomplished in a controlled atmosphere environment, and wherein said gentle pumping movement is consummated in a moderate reciprocating manner not exceeding exceeding substantially ten cycles per minute.

6. Means for achieving a liquid suspension of cathode ray tube phosphor material having a controlled particle-size range comprising:

a source of defined ultrasonic energy;

liquid holding means positioned to receive ultrasonic energy from said source, said liquid holding means having a quantity of collector liquid therein, said collector liquid holding means being in the form of an open flat-bottom container of a rigid material having a smooth surface;

reservoir means for holding a discrete liquid bath including means for freely supporting said collector liquid container said discrete liquid bath being agitated by said source of ultrasonic energy, the bottom exterior surface of said collector liquid container being oriented in at least fractional wavelength relationship with said energy source;

movable micro mesh sieve means having an upstanding wall peripheral to the foraminous area thereof, said sieve being oriented within said collector liquid holding means in a manner that the foraminous area is spaced from the bottom thereof but at a level to facilitate coverage by said collector liquid;

means for transferring at least a portion of a first suspension of diverse-particle-size phosphor material to said sieve means;

actuating means for moving said sieve in a substantially vertical manner combined with a slowly and slightly tilting motion to promote a gentle pumping action, said actuation effecting an exchange of suspension liquid, collector liquid and sieve-sized particles through said foraminous sieve area to provide a second liquid suspension of sieve-sized phosphor particles; and means for transferring said second suspension from said liquid holding means.

7. Means for achieving a liquid suspension of controlled particle size according to claim 6 wherein said several means are oriented in a controlled atmosphere environment.

8. Means for achieving a liquid suspension of controlled particle size according to claim 6 wherein thermal means is provided to impart controlled heat to said liquid bath to effect the proper temperature for efficient propagation of the desired ultrasonic energy waves therein.

* * * * *